(12) United States Patent
King et al.

(10) Patent No.: US 10,299,465 B2
(45) Date of Patent: May 28, 2019

(54) ORIOLE JELLY BIRDFEEDER

(71) Applicant: WOODSTREAM CORPORATION, Lititz, PA (US)

(72) Inventors: Andrew Nathan King, Lititz, PA (US); Judith Kim Hoysak, Lancaster, PA (US)

(73) Assignee: WOODSTREAM CORPORATION, Lititz, PA (US)

( * ) Notice: Subject to any disclaimer, the term of this patent is extended or adjusted under 35 U.S.C. 154(b) by 0 days.

(21) Appl. No.: 15/288,290

(22) Filed: Oct. 7, 2016

(65) Prior Publication Data

US 2017/0181411 A1 Jun. 29, 2017

Related U.S. Application Data

(63) Continuation of application No. 14/746,324, filed on Jun. 22, 2015, now Pat. No. 9,462,790, which is a continuation of application No. 13/785,417, filed on Mar. 5, 2013, now Pat. No. 9,089,111.

(51) Int. Cl.
| | |
|---|---|
| *A01K 39/02* | (2006.01) |
| *A01K 39/012* | (2006.01) |
| *A01K 39/01* | (2006.01) |
| *A01K 39/026* | (2006.01) |

(52) U.S. Cl.
CPC ............ *A01K 39/012* (2013.01); *A01K 39/01* (2013.01); *A01K 39/026* (2013.01)

(58) Field of Classification Search
CPC .. A01K 39/02; A01K 39/0206; A01K 39/012; A01K 39/01

USPC ............................. 119/53, 52.2, 57.8, 72, 74
See application file for complete search history.

(56) References Cited

U.S. PATENT DOCUMENTS

| | | | |
|---|---|---|---|
| 655,477 A * | 8/1900 | Combs ................. | A01K 5/0241 119/53.5 |
| 1,023,240 A | 4/1912 | Bowie | |
| 1,490,757 A * | 4/1924 | Baruth ................. | A01K 39/012 119/77 |
| 1,818,419 A * | 8/1931 | Miller .................. | A01K 13/003 119/53.5 |
| 1,922,612 A | 8/1933 | Barker | |
| 2,429,777 A | 10/1947 | Smith | |
| 2,475,207 A | 1/1949 | Smith | |
| 2,512,260 A | 6/1950 | Powell | |
| 2,721,537 A | 10/1955 | Miller | |
| 2,997,981 A | 8/1961 | Siggins | |
| 3,083,687 A | 4/1963 | Slaven | |
| 4,729,344 A | 3/1988 | Winkel | |
| 4,732,112 A | 3/1988 | Fenner et al. | |
| 4,945,859 A | 8/1990 | Churchwell | |
| 4,947,798 A | 8/1990 | De Wispelaere | |

(Continued)

*Primary Examiner* — Son T Nguyen
(74) *Attorney, Agent, or Firm* — Jacobson Holman, PLLC.

(57) ABSTRACT

An oriole jelly birdfeeder is provided that includes a jelly holding container, a base having a feeding platform and a connecting element for connecting the base to the container, and a mixing mechanism. The mixing mechanism includes a mixer element and a mixer handle which are coupled to one another and rotatable together. The mixer element includes a paddle positioned within the connecting element to enable the user to mix and distribute the jelly, which is held within the container, onto the feeding platform as needed by rotating the mixer handle.

19 Claims, 7 Drawing Sheets

(56) References Cited

U.S. PATENT DOCUMENTS

| | | | |
|---|---|---|---|
| 5,044,318 | A | 9/1991 | Sutton et al. |
| 5,085,173 | A | 2/1992 | Powers |
| 5,247,904 | A | 9/1993 | Anderson |
| 5,435,267 | A | 7/1995 | Patterson |
| 5,479,879 | A | 1/1996 | Biek |
| 6,199,511 | B1 | 3/2001 | Thibault |
| 7,984,694 | B2 | 7/2011 | Wu et al. |
| 2005/0000459 | A1 | 1/2005 | Buhl et al. |
| 2006/0231037 | A1 | 10/2006 | Gross |
| 2007/0289540 | A1 | 12/2007 | Stone et al. |
| 2008/0257273 | A1 | 10/2008 | Carter et al. |
| 2009/0199777 | A1 | 8/2009 | Webber |

\* cited by examiner

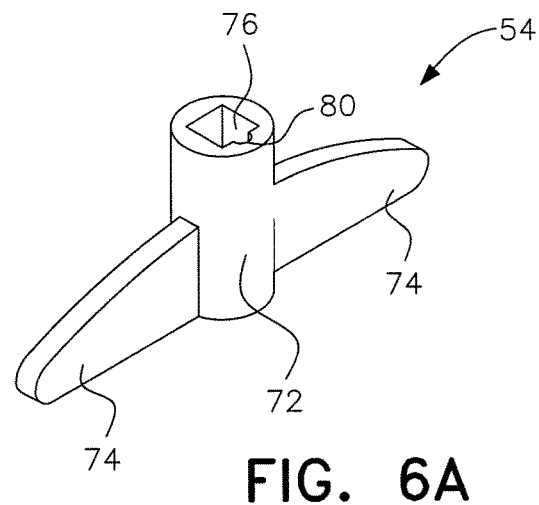
FIG. 6A
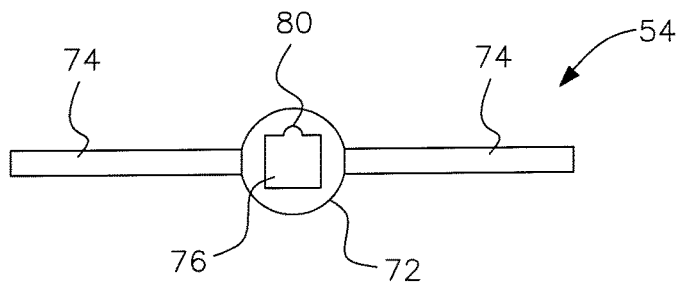
FIG. 6B
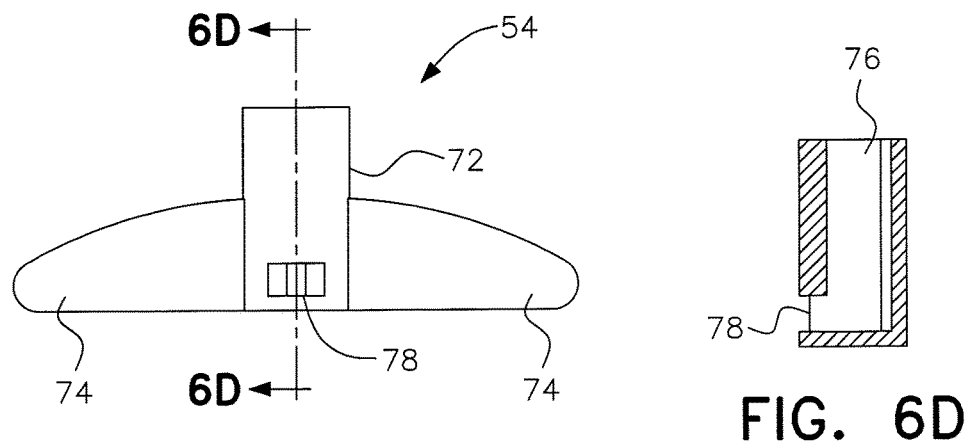
FIG. 6C
FIG. 6D

ORIOLE JELLY BIRDFEEDER

CROSS-REFERENCE TO RELATED APPLICATIONS

This application is a continuation of co-pending U.S. application Ser. No. 14/746,324, filed Jun. 22, 2015, issuing as U.S. Pat. No. 9,462,790 or Oct. 11, 2016, which is continuation of application Ser. No. 13/785,417 filed Mar. 5, 2013, issuing as U.S. Pat. No. 9,089,111 on Jul. 28, 2015, the priority of which is hereby claimed.

BACKGROUND OF THE INVENTION

Field of the Invention

The present invention is related to the field of birdfeeders and, more particularly, to a birdfeeder for dispensing jelly as a bird feed.

Description of the Related Art

Current jelly feeders require the user to manually scoop jelly onto the feeder platform of the feeder, with the jelly being stored in a container separate from the feeder. Whenever the user notes that the supply of jelly in the feeder platform is low, the user must bring the jelly container to the feeder and manually scoop some additional jelly into the feeding platform. This can be inconvenient if the jelly storage container is misplaced, and also can be potentially messy as jelly may be inadvertently spilled while the jelly is being scooped out and spread onto the feeding platform of the feeder.

Accordingly, a need exists for a jelly feeder that is configured to both store the jelly and to enable the user to dispense the jelly in controlled amounts.

SUMMARY OF THE INVENTION

Accordingly, the present invention is directed to an improved jelly birdfeeder including a jelly holding container, a base having a feeding platform and a connecting element for connecting the base to the container, and a mixing mechanism. The mixing mechanism includes a mixer element and a mixer handle which are connected to one another and coupled to the base to enable the user to mix and distribute the jelly, which is held within the container, onto the feeding platform as needed.

The mixer element includes a paddle that is positioned to be immersed in the jelly and a downwardly extending hooked arm to connect the mixer element to the mixer handle. The mixer handle has a connecting part with a keyed central aperture for receiving the hooked arm of the mixer element, and two wings extending out from opposite sides of the connecting part that are used by the user to rotate the mixer handle. When the user rotates the mixer handle, the mixer handle rotates the mixer element paddle within the jelly to mix and force the jelly out through openings formed in the base connecting element and onto the feeding platform.

In view of the foregoing, one object of the present invention is to overcome the difficulties of having to separately store jelly for a jelly feeder and then manually scoop some jelly from the storage container onto the jelly feeder's feeding platform using a spoon or other implement when additional jelly is needed.

Another object of the present invention is to provide a jelly birdfeeder in accordance with the preceding object in which the jelly birdfeeder includes a jelly holding container that provides for storage of the jelly within the feeder itself.

A further object of the present invention is to provide a jelly birdfeeder in accordance with the preceding objects in which the jelly birdfeeder has a base with a feeding platform and a connecting element for connecting the base to an open end of the container in which the jelly is stored, the open end being oriented downwardly and coupled to the connecting element when the feeder is in use.

A still further object of the present invention is to provide a jelly birdfeeder in accordance with the preceding objects in which the connecting element is an upwardly extending collar with a wall defining an interior space that receives jelly when the jelly-filled container is mounted to the base.

Yet another object of the present invention is to provide a jelly birdfeeder in accordance with the preceding objects in which the jelly birdfeeder has a mixing mechanism including a mixer element with a paddle and a downwardly extending hooked arm, and a mixer handle including a connecting part and two outwardly extending wings.

Still another object of the present invention is to provide a jelly birdfeeder in accordance with the preceding objects in which the paddle is positioned at least partly in said interior space to mix the jelly therein and the downwardly extending hooked arm protrudes from the base and is received within a keyed central aperture in the connecting part of the mixer handle to couple the mixer handle to the mixer element.

A further object of the present invention is to provide a jelly birdfeeder in accordance with the preceding objects in which the collar wall has at least one opening therein, the mixer handle when rotated by the user also rotating the mixer element paddle within the jelly to mix and force the jelly out through the opening and onto the feeding platform.

A still further object of the present invention is to provide a jelly birdfeeder in accordance with the preceding objects that is not complex in structure and which can be manufactured at low cost but yet efficiently stores jelly and, when the user desires, also dispenses the stored jelly onto the feeding platform in a desired amount.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 6A is a side perspective view of the mixer handle of the feeder as shown in FIG. 2.

FIG. 6B is a top view of the mixer handle shown in FIG. 6A, illustrating the keyed central aperture in the connecting part of the mixer handle for receiving the hooked arm of the mixer element.

FIG. 6C is a view of a first side of the mixer handle shown in FIG. 6A, the first side having an aperture therein.

FIG. 6D is a cut-away side view of the mixer handle taken along line A-A of FIG. 6C.

DETAILED DESCRIPTION OF THE PREFERRED EMBODIMENTS

Figure 1:
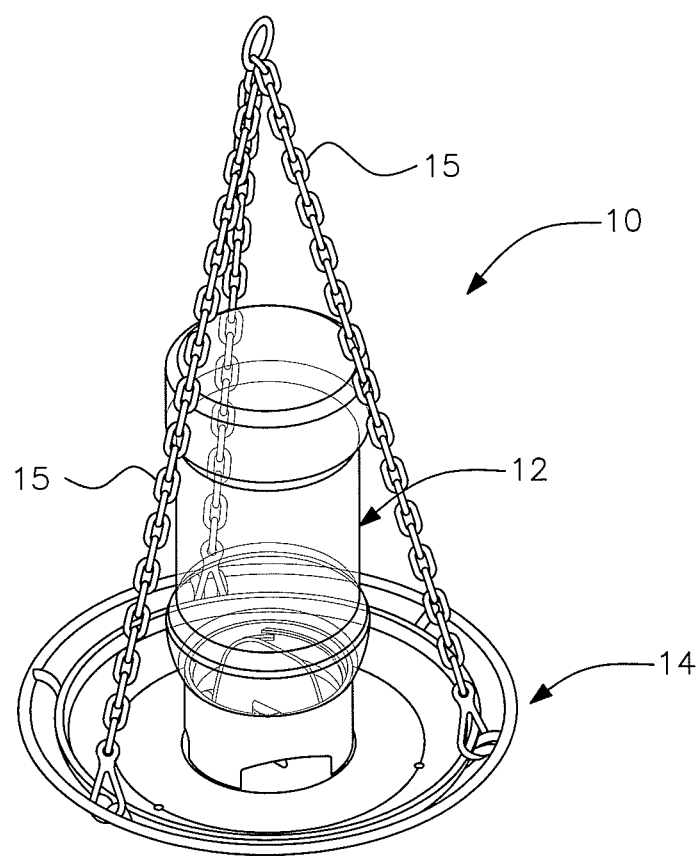
FIG. 1 shows a jelly birdfeeder in accordance with the present invention.

Although only one preferred embodiment of the invention is explained in detail, it is to be understood that the embodiment is given by way of illustration only. It is not intended that the invention be limited in its scope to the details of construction and arrangement of components set forth in the following description or illustrated in the drawings. Also, in describing the preferred embodiment and alternative structures, specific terminology will be resorted to for the sake of clarity. It is to be understood that each specific term includes all technical equivalents which operate in a similar manner to accomplish a similar purpose.

Figure 2:
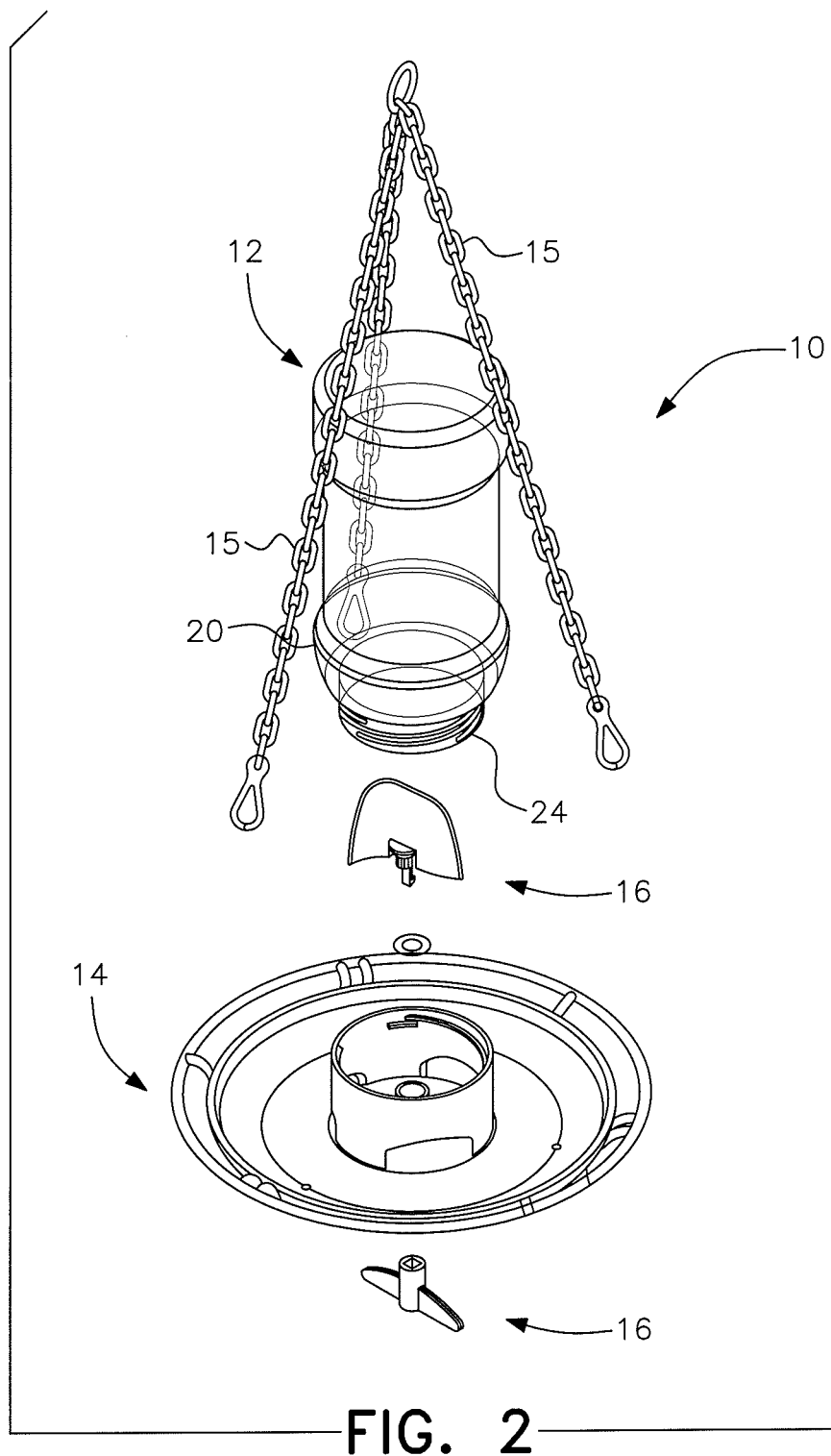
FIG. 2 is an exploded perspective view of the components of the jelly birdfeeder shown in FIG. 1.

As shown in FIGS. 1 and 2, the present invention is directed to a jelly birdfeeder generally designated by reference numeral 10. The jelly birdfeeder 10 includes a jelly holding container generally designated by reference numeral 12, a base generally designated by reference numeral 14 and a mixing mechanism generally designated by reference numeral 16. The feeder 10 is supported by chains 15 that allow the feeder to be suspended from a support element. The feeder 10 could also be supported in other ways, such as on a post, as would be understood by persons of ordinary skill in the art.

Figure 3A:
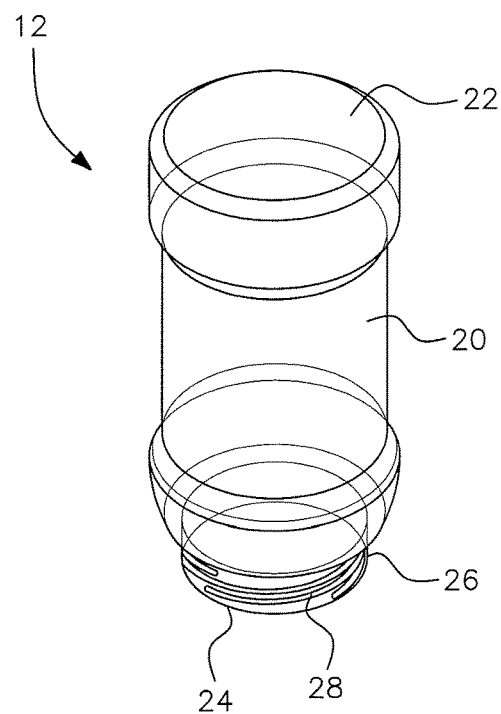
FIG. 3A is side perspective view of the jelly container shown in FIGS. 1 and 2.
Figure 3B:
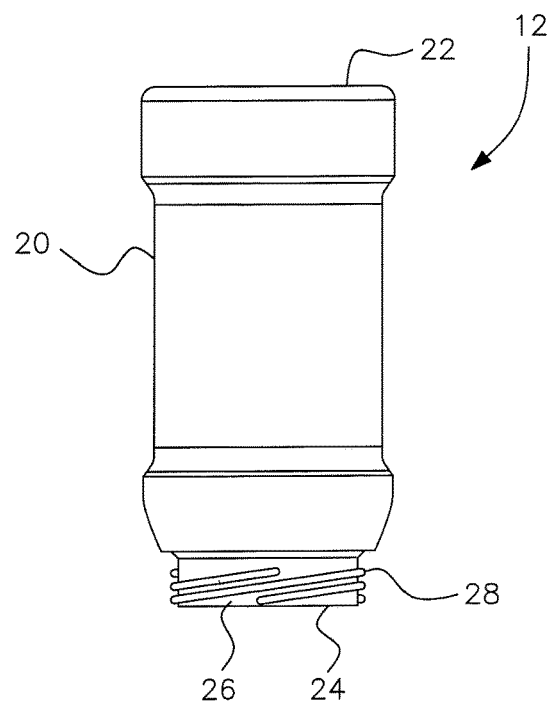
FIG. 3B is a side view of the jelly container shown in FIG. 3A.

In the embodiment shown in FIGS. 3A and 3B, the jelly holding container 12 is a jar 20 having a closed end 22 and an open end 24 through which the jar is filled with jelly; when the jar is assembled with the feeder the closed end 22 is the top end and the open end 24 is the bottom end. The open end 24 has a neck 26 with outer threads 28. While a threaded open end is shown, the open end 24 could have alternate connecting structures such as a snap fit or other type of connecting mechanism as would be understood by persons of ordinary skill in the art.

Figure 4A:
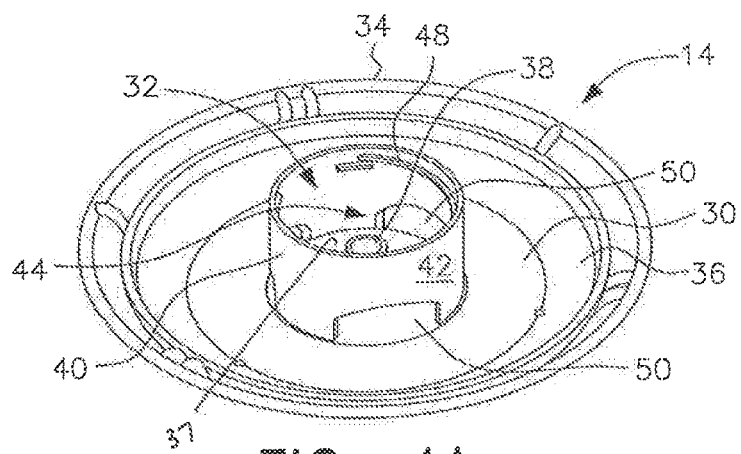
FIG. 4A is a side perspective view of the base of the feeder shown in FIGS. 1 and 2.
Figure 4B:
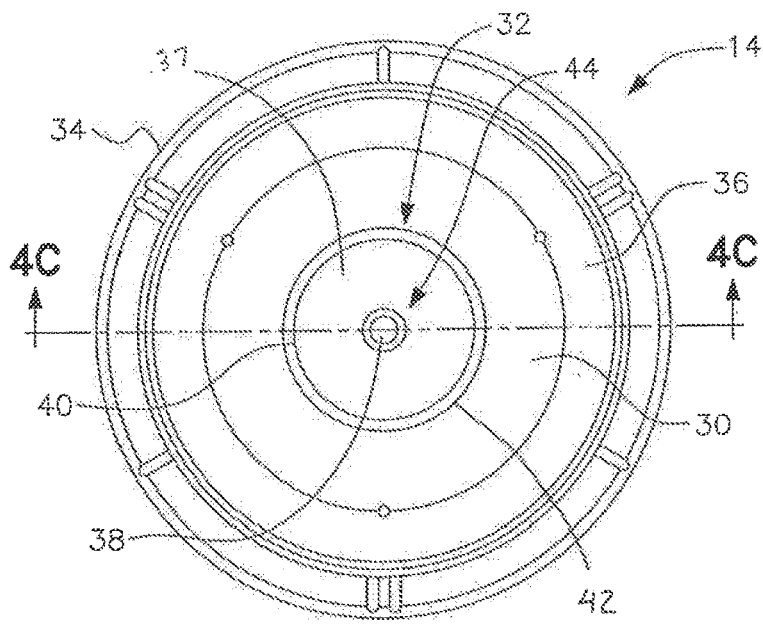
FIG. 4B is a top view of the base shown in FIG. 4A.
Figure 4C:
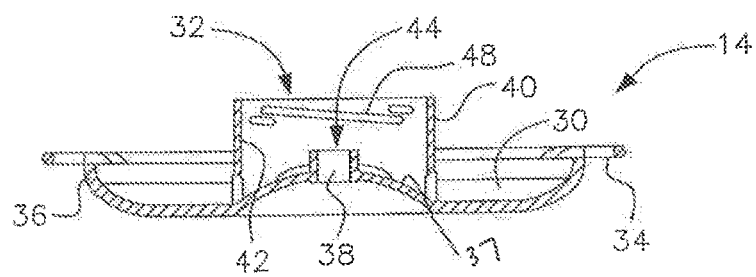
FIG. 4C is a cut-away side view of the base taken along line A-A of FIG. 4B.

As shown in FIGS. 4A-4C, the base 14 includes a feeding platform 30 and a connecting element generally designated by reference numeral 32 for connecting the base 14 to the open end 24 of the container 12 in which the jelly is stored. The base 14 may also include a perch rail 34 as shown. The feeding platform 30 includes a generally flat annular ring with a bowl shaped outer edge 36 to better contain the jelly once it is dispensed onto the platform. As shown in FIG. 4C, the center area 37 of the base, which is surrounded by the connecting element 32, is convex, sloping downwardly from a central aperture 38. The aperture 38 receives the mixing mechanism 16, as will be described hereinafter.

In the embodiment shown, the connecting element 32 is an upwardly extending collar 40 with a generally cylindrical wall 42 surrounding a base central area and defining an interior space generally designated by reference numeral 44. The inner surface 46 of the wall 42 has threads 48 to threadedly engage with the outer threads 28 on the neck 26 of the container 12 when the container is screwed into the collar 40. The shape and configuration of the collar 40 and the threads 48 are sized to accept common commercial jelly jars like those sold under the SMUCKERS® and GREAT VALUE® brands. The threads of the feeder may be modified during manufacture to provide another thread pitch to fit other jars as would be understood by persons of skill in the art. Further, as noted above in connection with the container 12, the collar may have other connecting structures such as a snap fit or the like. When the container 12 is filled with jelly, connected to the collar 40, and inverted to the position shown in FIG. 1, jelly flows downwardly into and fills the interior space 44 of the collar.

As shown in FIG. 4A, the collar wall 42 includes at least one opening 50, and preferably a plurality of openings. The openings 50 allow the jelly contained within the interior space 44 of the collar 40 to be dispensed onto the feeding platform 30 by the mixing mechanism 16. The downward slope of the convex central area 37 facilitates flow of the jelly toward the openings 50.

Figure 5A:
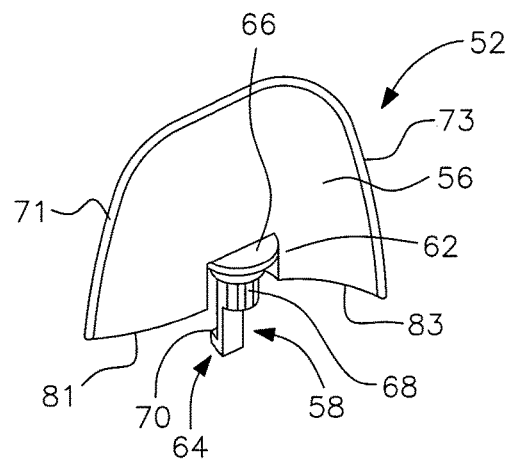
FIG. 5A is a side perspective view of the mixer element of the feeder shown in FIG. 2.
Figure 5B:
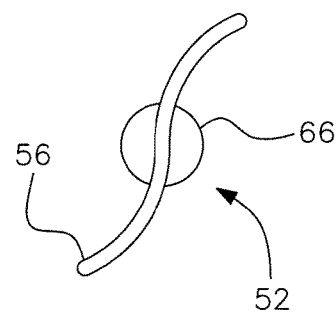
FIG. 5B is a top view of the mixer element shown in FIG. 5A, showing the curved shape of the paddle.
Figure 5C:
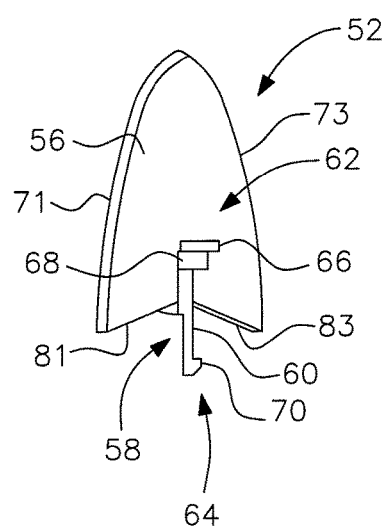
FIG. 5C is a side view of a first side of the mixer element shown in FIG. 5A, showing the hooked arm of the mixer element.
Figure 5D:
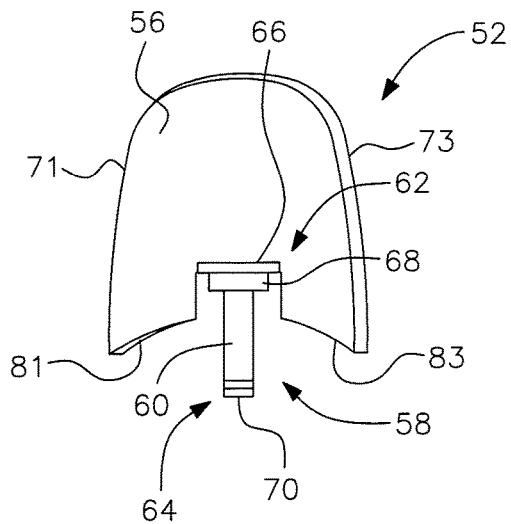
FIG. 5D is a side view of a second side of the mixer element shown in FIG. 5A, the second side being perpendicular to the first side which is shown in FIG. 5C.

The mixing mechanism 16 includes a mixer element generally designated by reference numeral 52 and a mixer handle generally designated by reference numeral 54. As shown in FIGS. 5A-5D, the mixer element 52 has a paddle 56 with a curved upper or vertical profile as shown in FIG. 5B, and a downwardly extending hooked arm generally designated by reference numeral 58. The curvature of the paddle 56 provides a simple and effective paddle design for scooping and pushing the jelly. In the embodiment shown, the upper end of the paddle has an arched shape with downwardly inclined edges 71, 73. The bottom edges 81, 83 of the paddle on either side of the hooked arm are also downwardly inclined, best seen in FIG. 5D, giving the paddle an overall shape like that of a shovel. The shape and configuration of the paddle, with the downwardly inclined bottom edges 81, 83 adjacent and complementary with the convex central area 37 of the base, assists in moving jelly downwardly and outwardly. Other paddle shapes could be used, however.

In addition, the mixing element could include two or more paddles (not shown). If two paddles are used, the second paddle is preferably oriented generally perpendicular to the first paddle.

The hooked arm 58 includes a mounting post 60 with an upper component generally designated by reference numeral 62 and a lower component generally designated by reference numeral 64. The upper component 62 has a disc shaped top member 66 coupled on top of a keyed shelf 68. The shelf 68 extends generally perpendicular to the mounting post 60 on one side thereof. The lower component 64 includes a hook 70. The hook 70 preferably faces the side of the mounting post 60 opposite the mounting post side having the keyed shelf 68. This opposing relationship is not necessary, however.

As shown in FIGS. 6A-6D, the mixer handle 54 includes a central connecting part 72 and two outwardly extending wings 74. In the embodiment shown, the central connecting part 72 is generally cylindrical and includes a keyed central aperture 76 and an open slot 78 near the base of the connecting part 72. The keyed central aperture 76 extends axially through the connecting part 72 and receives the hooked arm 58 of the mixer element 52 to couple the mixer handle 54 to the mixer element 52. The aperture 76 may be of a variety of shapes provided the aperture is keyed to the shape of the hooked arm 58 so that the mixer element 52 turns with the mixer handle 54.

In the embodiment shown, the keyed aperture 76 is generally square and includes a recess 80. The slot 78 near the base of the connecting part may have various shapes provided the slot 78 is configured to receive and retain the hook 70 of the hooked arm 58. To connect the mixer element with the mixer handle, the hook 70 is depressed to fit into the aperture 76. When the hook reaches the slot 78, the hook 70 relaxes into the slot, thus locking the assembly of the mixer element 52 and the mixer handle 54 in a fixed relationship with one another. The shelf 68, which is received in the recess 80, ensures that the two parts of the mixing mechanism are properly assembled. The fixed relationship ensures that rotation of the mixer handle results in corresponding rotation of the mixer element. If the user wants to separate the mixer handle from the mixer element, the user can depress the hook back into the mixer handle and pull the mixer handle and mixer element apart.

The wings 74 of the mixer handle enable the user to grasp and rotate the mixer handle to turn the mixer element. In the embodiment shown, the wings are in opposing relationship, extending outwardly and generally perpendicular to the central connecting part 72. The wings 74 do not have to be in alignment with one another, as shown in FIG. 6B, but may be offset while still being effective in use to rotate the mixer handle.

Figure 7:
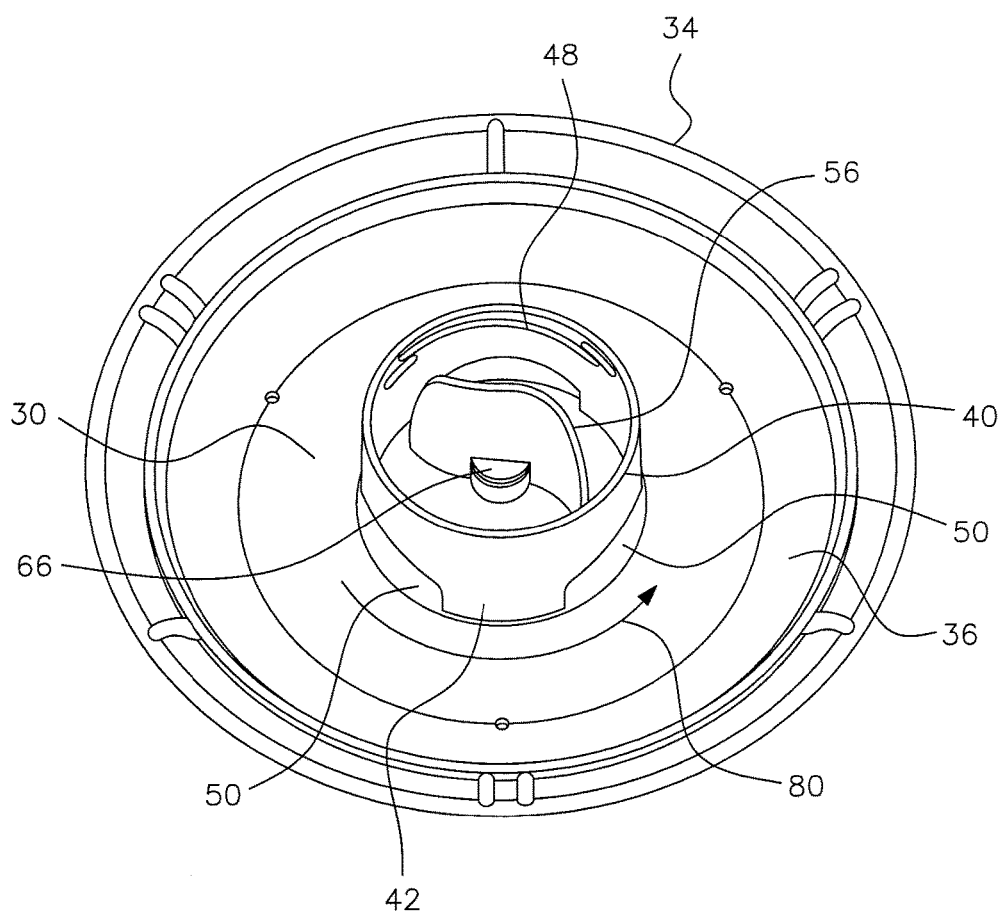
FIG. 7 is a top perspective view of the base as shown in FIG. 2 with the mixing element assembled therein.

When the base and the mixing mechanism of the feeder are assembled for use, the paddle 56 is positioned at least partly in the interior space 44 of the collar 40 as shown in FIG. 7. The width of the paddle 56 is less than the inner diameter of the neck 26 of the container 12 that is coupled to the collar to allow the paddle to be rotated therein. Preferably, the side edges 71, 73 of the paddle nearly contact the inner wall of the collar and container. As the user rotates the mixer element 52 using the mixer handle 54 in the direction shown by arrow 80, the paddle is moved in a substantially horizontal plane and mixes the jelly, with the curvature of the paddle forcing the jelly out through the openings 50 in the wall 42 of the collar 40 and onto the feeding platform 30. The shape of the paddle is designed for maximum effectiveness when rotated counter-clockwise in direction 80. Because the container 12 is positioned above the base 14 with its open end 24 facing downwardly, gravity assists the mixing mechanism 16 in moving the jelly out of the jar.

In use, the user fills the container with jelly and then couples the container to the base, such as by the threaded engagement disclosed herein. When the feeder is inverted, jelly moves downwardly into the interior space 44 defined by the collar where it is contained. To dispense the desired amount of jelly onto the feeding platform, the user manually activates the mixer handle as positioned beneath the lower surface of the base central area to turn the mixer element. In the embodiment shown, the mixer handle is preferably rotated counter-clockwise due to the curvature of the paddle. The paddle, being moved in a substantially horizontal plane, forces the jelly out through the collar openings and continues to do so until the user stops rotating the mixer handle at which time jelly movement ceases. The paddle may also be rotated clockwise, but, with the shape disclosed herein, is not as effective in pushing the jelly out when rotated clockwise as compared to the counter-clockwise direction 80.

While the embodiment disclosed herein utilizes a rotating mixing mechanism, the mixing and distribution of the jelly could be attained through a non-rotary motion such as a pumping action or the like. The present invention is intended to include all jelly birdfeeders with jelly storage containers and a mechanism that allows the user to distribute jelly easily at any time and in desired amounts.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A jelly birdfeeder for storing and dispensing jelly comprising:
   a jelly holding container having an externally threaded open end;
   a base having an internally threaded collar for connecting the base to the open end of the jelly holding container and an open feeding platform upon which jelly is dispensed, said collar having a wall surrounding a base central area and defining an interior space that is filled with jelly from said container when said base and container are connected for use, said feeding platform being at least partly around said collar, said collar wall having an opening therein to allow jelly in the interior space to communicate with said feeding platform which remains open for direct bird access to the jelly on the feeding platform when said feeder is in use; and
   a mixing mechanism coupled to the base, said mixing mechanism including a paddle and a handle connected to said paddle, said paddle operative within the interior space to mix and push jelly from the interior space in the base through the collar opening and onto said feeding platform when the handle is manually activated by the user to move the paddle, said handle being positioned beneath a lower surface of the base central area to enable the user to distribute jelly onto the feeding platform at any time and in desired amounts without contacting the jelly, said paddle moving in a substantially horizontal plane in response to the manual activation of the handle beneath the lower surface of the base central area by the user.

2. The jelly birdfeeder as set forth in claim 1, wherein the paddle is connected to the handle by an arm that passes from the interior space to said base lower surface through an aperture in the base, a bottom end of said arm projecting outwardly beyond said base lower surface.

3. The jelly birdfeeder as set forth in claim 2, wherein the handle is configured to be connected to the arm in a fixed relationship so that movement of the handle also moves the paddle.

4. The jelly birdfeeder as set forth in claim 3, wherein the paddle is rotatably movable within the collar to force jelly out through the collar wall opening when rotated.

5. The jelly birdfeeder as set forth in claim 4, wherein a rotational axis of said paddle is aligned with a center axis of said collar.

6. The jelly birdfeeder as set forth in claim 5, wherein said paddle has a central part attached to an upper end of said arm at said rotational axis and two downwardly inclined outer edges that extend radially outward from said rotational axis toward the collar wall to give the paddle an arched shape.

7. The jelly birdfeeder as set forth in claim 5, wherein said base central area surrounded by the wall of the collar is convex and said paddle has a central part attached to an upper end of said arm at said rotational axis and two downwardly inclined lower edges that extend radially outward from said rotational axis toward the collar wall, said downwardly inclined lower edges of said paddle being adjacent and complementary with said convex base central area to facilitate pushing of the jelly downwardly and outwardly through the collar wall opening.

8. The jelly birdfeeder as set forth in claim 1, wherein the paddle and the handle are releasably connected to one another.

9. The jelly birdfeeder as set forth in claim 1, wherein the open feeding platform has a generally flat upper surface with an upwardly directed bowl-shaped outer edge, the upper surface of said feeding platform providing unobstructed access to jelly on the feeding platform.

10. The jelly birdfeeder as set forth in claim 1, wherein the handle is positioned under and in generally vertical alignment with the paddle.

11. A jelly birdfeeder for storing and dispensing jelly comprising:
a jelly holding container having an open end;
a base having a feeding platform and a central area with a connecting part for connecting the base to the open end of the container, said connecting part including an upwardly directed collar defining an interior space in the central area on an upper side of said base and having at least one jelly dispensing opening in a side thereof, jelly from said container entering said interior space when said base and container are connected for use; and
a manually operated mixing mechanism operative with the base, the mixing mechanism including a pushing element and a handle, said pushing element being movably positioned within the interior space of the collar and configured to push jelly out through the collar opening from the interior space and onto the feeding platform when activated by the user using the handle, a position of said handle being outside said base generally opposite said feeding platform and being configured so that movement of said handle by the user also moves the pushing element in a substantially horizontal plane to push jelly onto the feeding platform, the position of said handle outside the base enabling the user to distribute jelly onto the feeding platform at any time and in desired amounts without contacting the jelly, an upper surface of said feeding platform being open when the feeder is in use to provide unobstructed access to the jelly on the feeding platform.

12. The jelly birdfeeder as set forth in claim 11, wherein the pushing element is rotatably movable within the collar to force jelly out through the collar opening when rotated.

13. The jelly birdfeeder as set forth in claim 12, wherein a rotational axis of said pushing element is aligned with a center axis of said collar.

14. The jelly birdfeeder as set forth in claim 12, wherein said handle is coupled to said pushing element by an arm, an upper end of said arm being connected to the pushing element and a lower end of said arm being connected to said handle.

15. The jelly birdfeeder as set forth in claim 14, wherein a rotational axis of said pushing element is aligned with a center axis of said collar, said pushing element having a central part attached to the upper end of said arm at said rotational axis and also having two downwardly inclined lower edges that extend radially outward from said rotational axis toward the collar wall, said base central area being convex and said downwardly inclined lower edges of said pushing element being adjacent and complementary with said convex base central area to facilitate pushing of the jelly downwardly toward and outwardly through the collar wall opening.

16. The jelly birdfeeder as set forth in claim 11, wherein the handle is positioned under and in generally vertical alignment with the pushing element.

17. The jelly birdfeeder as set forth in claim 16, wherein the handle projects outwardly beyond a lower side of the base under the feeding platform.

18. A method of dispensing jelly to a feeding platform of a jelly birdfeeder comprising the steps of:
providing a jelly birdfeeder for storing and dispensing jelly, the birdfeeder including a jelly holding container having an open end, a base having an open unobstructed feeding platform and a connecting part for connecting the base to the open end of the container, said connecting part including an upwardly directed wall defining an interior space on an upper side of said base and having at least one jelly dispensing opening therein, jelly from said container entering said interior space when said base and container are connected for use, and a manually operated mixing mechanism having a pushing element and a handle operative with the base, said pushing element configured to mix and push jelly from the interior space in the base through the at least one jelly dispensing opening in the wall and onto the open feeding platform when manually activated by the user using the handle, the handle projecting outwardly beyond a bottom of the base under the feeding platform;
putting jelly in the container and then coupling the container to the base to assemble the feeder;
inverting the feeder so that jelly moves downwardly into the interior space defined by the wall;
dispensing some of the jelly onto the open feeding platform by moving the handle to concurrently move the pushing element in a substantially horizontal plane so that the pushing element pushes jelly out of the interior space through the at least one jelly dispensing opening in the wall, positioning of the handle under and outside said base and extending beyond the bottom thereof enabling the user to grasp the handle to manually distribute jelly without coming into contact with the jelly that is on the open feeding platform of the base.

19. The method as set forth in claim 18, further comprising the step of, after dispensing the jelly, discontinuing movement of the manually operated mixing mechanism, said container holding and storing undispensed jelly thereafter until the user again initiates movement of the manually operated mixing mechanism to dispense more jelly onto the feeding platform.

* * * * *